Jan. 5, 1943. C. KÖNIG 2,307,317
MEANS FOR OBTAINING RELATIVE MOVEMENT OF AIRCRAFT PARTS
Filed Jan. 4, 1939 2 Sheets-Sheet 1
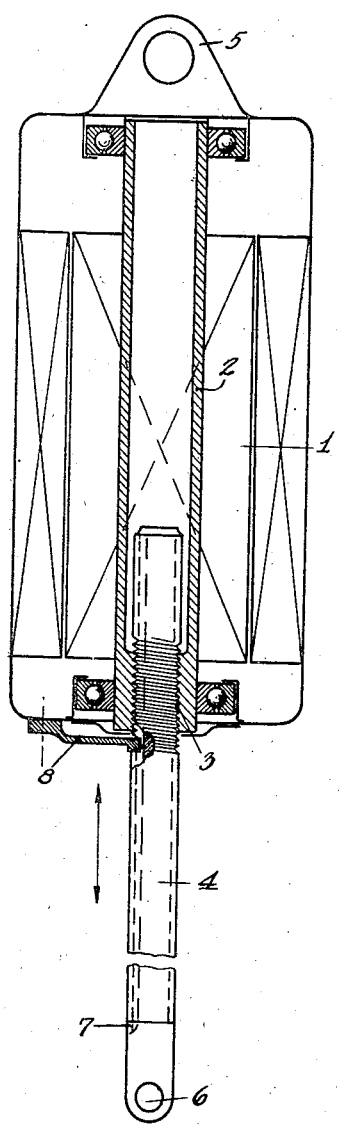
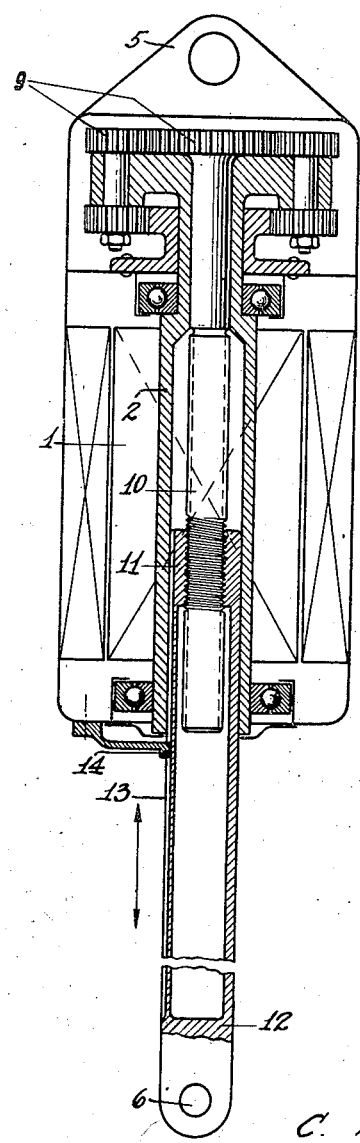
Inventor,
C. König
By Hascock Downing & Seebold
Attorneys.

Jan. 5, 1943.  C. KÖNIG  2,307,317
MEANS FOR OBTAINING RELATIVE MOVEMENT OF AIRCRAFT PARTS
Filed Jan. 4, 1939  2 Sheets-Sheet 2
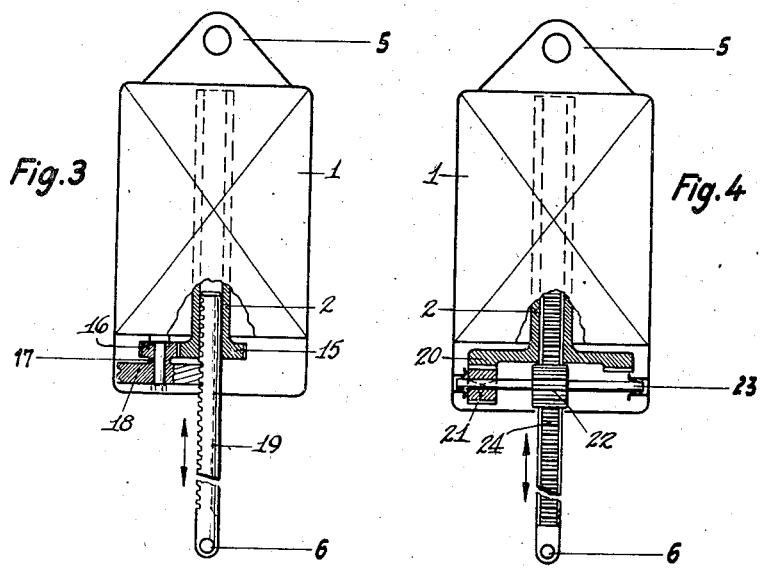
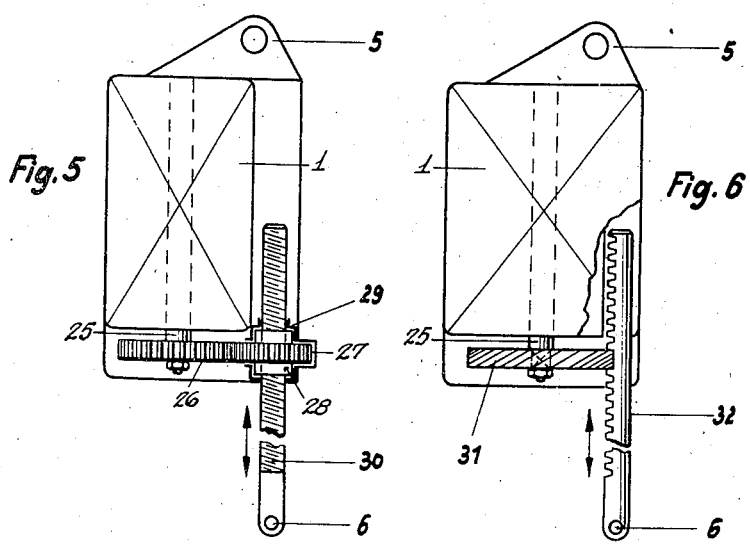
Inventor,
C. König
By Glascock Downing & Seebold
Attorneys.

Patented Jan. 5, 1943

2,307,317

UNITED STATES PATENT OFFICE 2,307,317

MEANS FOR OBTAINING RELATIVE MOVEMENT OF AIRCRAFT PARTS

Carl König, Stuttgart, Germany; vested in the Alien Property Custodian

Application January 4, 1939, Serial No. 249,326
In Germany January 12, 1938

7 Claims. (Cl. 254—100)

Pneumatic and hydraulic devices are used for moving structural parts of aircraft, but as a rule the hydraulic arrangements are preferred because the devices with a pressure medium of variable volume are unreliable in operation and also difficulties are encountered in sealing.

The hydraulic devices which are generally preferred for moving aircraft parts have certain disadvantages. The fluid pressure medium may freeze and thereby make the action of the device doubtful and also on account of the oil filled pipes which connect the individual parts of such a hydraulic arrangement, there is an undesirable increase in weight which should be avoided as far as possible. There are also certain difficulties met in the maintenance and the operations involved therewith, since it is necessary after first cutting off the supply of liquid to disconnect a number of tube connections and to let out the liquid contained therein. When for any reason one of the pipes is destroyed the device can only be put in operation again under certain conditions, that is if the necessary appliances and the necessary time are available.

These facts are sufficient reasons for employing electromotive force for devices for actuating aircraft parts. The method hitherto used has been such that from an electrical power source the conversion into reciprocatory movement was effected by transmission elements of various kinds such as shafts, rods, levers, chains and the like. Although these arrangements for moving aircraft parts have some advantages over pneumatic or hydraulic devices, they are still disadvantageous as regards the necessary constructional expense and the complicated construction.

This is avoided by the present invention in a particularly simple manner.

The invention is characterised by a strut of variable length in which an electric motor, the direction of running of which can be controlled, forms a constituent of the strut extending between two points of suspension and the rotation of the motor shaft is converted directly or indirectly into a longitudinal movement of the strut rod.

According to the invention in the motor part of the strut a hollow space is provided in which the strut rod moves longitudinally in the direction of an axis which may or may not coincide with the motor axis. In one construction of the invention the hollow motor shaft has an internal thread and accommodates the strut rod which is formed as a spindle. In another construction the end of the strut rod forms a spindle nut surrounding a screw spindle which carries the sun wheel of a planet gear driven by the hollow motor shaft.

In another construction of the invention the strut rod is constructed as a toothed rod and is driven by the hollow motor shaft which accommodates it through a toothed wheel with sets of wheels interposed. The strut rod in the form of a screw spindle may also be surrounded by the hub of a pinion which is held fast in a bearing casing and the counter wheel of which is mounted on the motor shaft. A further possibility is that the solid motor shaft carries a wheel with inclined teeth which engages with the strut rod which is provided with teeth and is guided in the motor casing.

If the new adjustable strut consisting of a motor part and a strut rod is used for retracting and lowering an undercarriage, the invention provides the possibility of releasing the strut movement by hand in case of a breakdown of the electric motor.

Constructional examples of the invention are illustrated diagrammatically in the accompanying drawings.

Fig. 1 shows a constructional form of the new strut in longitudinal section in which a hollow motor shaft serves as a spindle nut for a threaded strut rod.

Fig. 2 shows in longitudinal section a construction provided with a step-down gear in which the strut rod end in the form of a nut coacts with a spindle mounted in a hollow motor shaft and carrying the large wheel of a planet gear.

Fig. 3 illustrates partly in longitudinal section and partly in elevation how a toothed wheel arranged at the end of the hollow motor shaft drives indirectly through a toothed wheel gear a strut rod in the form of a toothed rod.

Fig. 4 shows partly in longitudinal section a constructional form with toothed wheel gear and a driving wheel carried by a toothed wheel axle for the strut rod with straight teeth accommodated by the hollow motor shaft.

Fig. 5 shows partly in longitudinal section a constructional form with a strut rod arranged out of the axis of the motor shaft which carries a toothed wheel, the spindle nut being formed by the hub which is held fast in a casing of the counter wheel.

Fig. 6 shows partly in longitudinal section a construction in which a toothed wheel secured on the motor shaft drives the strut rod which is mounted out of the centre and is in the form of a toothed rod.

Referring to Fig. 1, the reversible electric motor 1 drives the hollow motor shaft 2 which at its lower end has a thread 3. Inside the shaft 2 the strut rod 4 in the form of a spindle is moved longitudinally. The motor casing has a connecting part 5 for securing to the aircraft body or other rigid member while the end 6 of the strut rod is formed for connection with the moving part, for example a retracting undercarriage. For guiding the strut rod in a straight line it may be provided with a longitudinal groove 7 in which engages a guiding part 8 connected with the motor casing.

Referring to Fig. 2 the rotation of the hollow motor shaft 2 is transmitted through planet gearing 9 to the threaded spindle 10 extending into the hollow shaft 2 and carrying at its end the sun wheel of the planet gear. The upper end 11 of the strut rod 12 sliding in the shaft 2 is formed as a spindle nut. The strut rod 12 is again guided in a straight line by means of a part 14 secured on the motor casing and engaging in a groove 13 of the strut rod.

Referring to Fig. 3 at the end of the hollow shaft 2, there is provided a toothed wheel 15 which engages with the wheel 16 of the double wheel 17. The second wheel 18 which has inclined teeth coacts with the toothed strut rod 19 which slides in the hollow motor shaft.

In Fig. 4 the wheel 20 with inclined teeth which is attached to the hollow shaft 2 engages with a wheel 21 which is secured together with a driving wheel 22 on a shaft 23 at right angles to the motor shaft. The strut rod 24 is provided with straight teeth.

In Fig. 5 the motor shaft 25 carries a toothed wheel 26. This engages with a wheel 27 the hub 28 of which is held in a bearing casing 29 and has an internal thread for receiving the strut rod 30 which is constructed as a spindle.

In Fig. 6 there is provided on the motor shaft a toothed wheel 31 with inclined teeth which drives the toothed strut rod 32 which is mounted laterally in the motor casing.

The arrangement according to the invention for driving aircraft parts by means of electrical force is independent of temperature and involves no difficulties of sealing. Further the necessary supply cables can be led where desired without difficulties and without involving much weight. A further important advantage is that the new arrangement as compared with known constructions is of small weight and can easily be assembled and removed at any time.

What I claim is:

1. Means for obtaining relative movements of aircraft parts including a reversible electric motor having means thereon adapted to effect a pivotal connection with one part of an aircraft, a strut rod having means thereon adapted to effect a pivotal connection with another aircraft part, and means connecting the strut rod to the motor to effect a relative longitudinal movement therebetween.

2. A variable strut for aircraft including a casing having means thereon adapted to effect a pivotal connection with an aircraft part, a reversible electric motor within the casing, a strut rod having means thereon adapted to effect a pivotal connection with another aircraft part and mounted for axial movement within the casing and an operative connection between the strut and motor for effecting axial movement of the strut rod by the motor.

3. Means for obtaining relative movements of aircraft parts including a reversible electric motor composed of a stator having means thereon adapted to effect a pivotal connection with one of the aircraft parts and a rotor operable within the stator, a strut rod having means thereon adapted to effect a pivotal connection with the other aircraft part and movable longitudinally within the stator, and means for converting the movement of the rotor into a longitudinal relative movement between the strut rod and the stator when the rotor is rotated.

4. Means for obtaining relative movements of aircraft parts including a reversible electric motor composed of a stator having means thereon adapted to effect a pivotal connection with one of the aircraft parts and a hollow rotor operable within the stator, a strut rod having means thereon adapted to effect a pivotal connection with the other aircraft part and movable longitudinally within the rotor and means for converting the movement of the rotor into a relative longitudinal movement between the strut rod and the stator when the rotor is rotated.

5. Means for obtaining relative movements of aircraft parts including a reversible electric motor composed of a stator having means thereon adapted to effect a pivotal connection with one of the aircraft parts and a hollow internally threaded rotor operable within the stator, an externally threaded strut rod having means thereon adapted to effect a pivotal connection with the other aircraft part and in threaded engagement within the rotor for producing relative longitudinal movement between the strut rod and the rotor when the rotor is rotated.

6. Means for obtaining relative movements of aircraft parts including a stator having means thereon adapted to effect a pivotal connection with one of the aircraft parts, a reversible hollow rotor within the stator and formed with a toothed wheel at the end thereof, a toothed rod having means thereon adapted to effect a pivotal connection with the other aircraft part and axially movable within the rotor, and gearing means connecting the toothed wheel and the toothed rod for producing longitudinal relative movement between the strut member and the stator when the rotor is rotated.

7. Means for obtaining relative movements of aircraft parts as claimed in claim 6 in which the gearing means includes a double gear wheel arrangement, the smaller wheel in engagement with the rotor and the larger wheel provided with inclined teeth and in engagement with the toothed rod.

CARL KÖNIG.